A. E. FLOWERS.
COMBINED SCRAPER AND AGITATOR.
APPLICATION FILED JAN. 8, 1920.
1,366,777.
Patented Jan. 25, 1921.
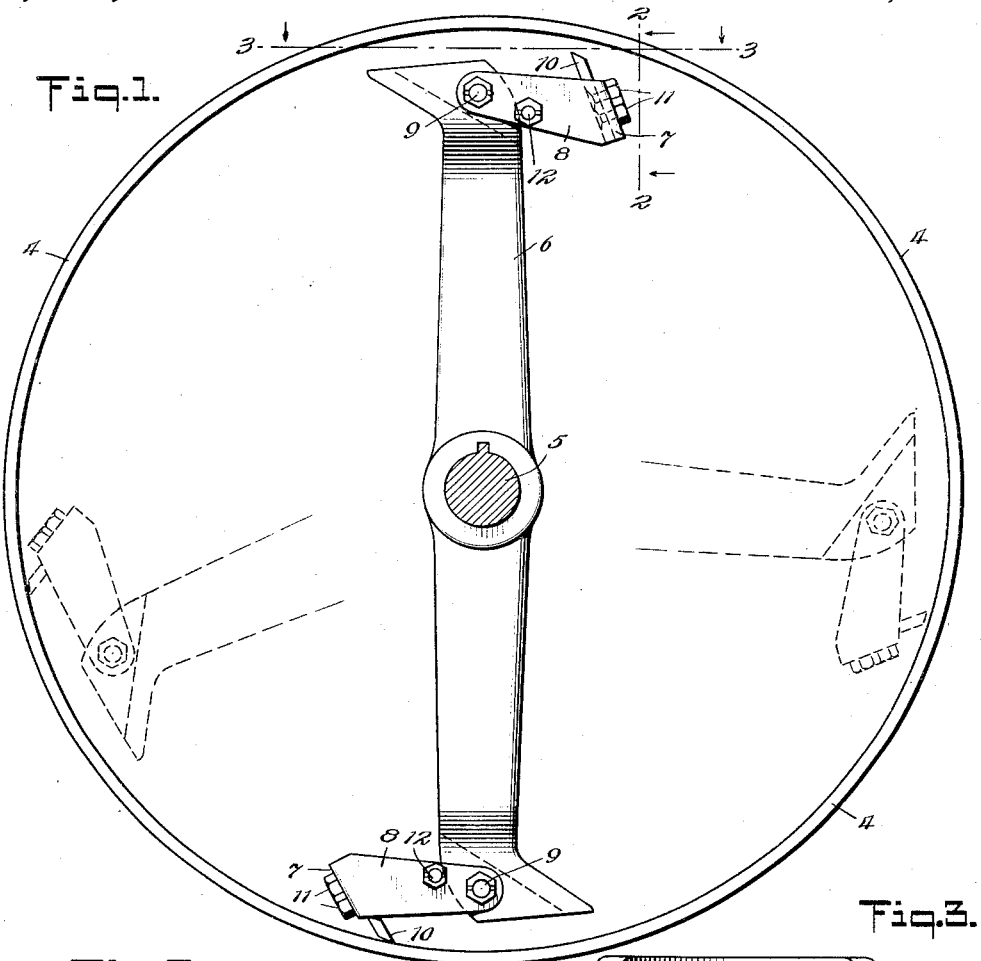
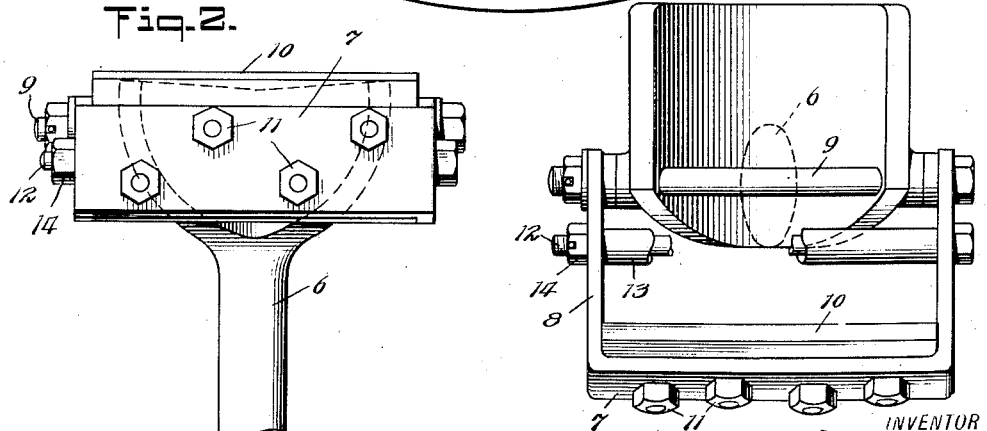

UNITED STATES PATENT OFFICE.

ALAN ESTIS FLOWERS, OF BUFFALO, NEW YORK, ASSIGNOR TO NATIONAL ANILINE & CHEMICAL COMPANY, INCORPORATED, A CORPORATION OF NEW YORK.

COMBINED SCRAPER AND AGITATOR.

1,366,777.      Specification of Letters Patent.      Patented Jan. 25, 1921.

Application filed January 8, 1920. Serial No. 350,088.

*To all whom it may concern:*

Be it known that I, ALAN ESTIS FLOWERS, a citizen of the United States, residing at 267 Elmwood avenue, Buffalo, in the county of Erie, State of New York, have invented certain new and useful Improvements in Combined Scrapers and Agitators; and I do hereby declare the following to be a full, clear, and exact description of the invention, such as will enable others skilled in the art to which it appertains to make and use the same.

This invention relates to scraper or agitator mechanisms for use in apparatus of various types and for various uses, such for instance as vacuum stills employed in the preparation of aniline dyestuffs. The invention is directed to the provision of a scraper mechanism of an improved construction which is reliable and efficient in its operation, which is inexpensive, which is self-adjusting to meet varying conditions and is specially effective in removing deposit from the wall of an agitator tank or preventing the accumulation of a deposit upon the wall.

The invention involves the provision of a movable member in an agitator tank and a scraper pivotally mounted on this movable member with its surface inclined to the direction of movement of the movable member, so that as the scraper is moved along, it will be caused to turn about its pivotal support to a position in which its edge bears upon the wall of the receptacle to prevent the accumulation of a deposit thereon. Preferably a tank is employed within which is mounted a rotatable shaft having a plurality of radial arms and a scraper is pivotally mounted on each of these arms near the end thereof. Preferably a supporting structure is pivotally mounted upon the end of each of the radial arms and the scraper is a separate blade removably mounted upon this support so that when wear of the scraper blade occurs it may be removed and a new one substituted for it. The angular arrangement of the scraper blade when seated upon its support is preferably such that its forward edge is slightly in advance of its rear edge, circumferentially of the tank. Thus, when the radial arms are rotated, the pressure of the substance in the tank upon the face of each scraper blade together with the proper angular setting of the scraper blade causes the blade and its support to turn about their pivotal connection to the radial arm in a direction to carry the edge of the scraper blade into engagement with the wall of the tank. The angular inclination of the blade is preferably such that its edge bears but lightly upon the wall of the tank, sufficient to cause the edge of the blade to dig into any scale deposited upon the wall of the tank but at the same time allow the blade to yield readily when necessary. Often such tanks vary in diameter over a substantial range and the scraper blade mounted as above outlined will follow the wall of the tank throughout these changes of diameter.

The preferred embodiment of the invention is illustrated in the accompanying drawings in which Figure 1 is a plan view, Fig. 2 is a side view of one of the radial arms with the parts mounted thereon taken on line 2—2 of Fig. 1, and Fig. 3 is a view of the end of one of the arms with its associated parts taken on line 3—3 of Fig. 1.

Referring to the drawings, the receptacle, which may be a vacuum still or an autoclave, is indicated at 4. It may contain a liquid or semi-liquid substance that, in the course of treatment, might tend to cake or agglomerate on the walls, which caked material is difficult of removal and which seriously hinders the transmission of heat to the liquid on the inside. In the present instance, this receptacle is shown as a cylindrical tank. Within the receptacle are one or more movable members arranged to be moved by power to effect agitation of the material within the receptacle and to scrape off caked or agglomerated material from the walls thereof. In the present instance, a central rotatable shaft 5 is mounted within the tank 4 and on this shaft are a plurality of radial arms 6. The conformation given to the ends of the arms may be that illustrated in the drawing though the precise shape given these arms forms no part of the present invention.

On the end of each of the arms 6 is a pivotally mounted support 7. This support 7 has integral side members 8 and a bolt 9 passes through openings in these side members and an opening in the end of the arm 6 to pivot the support 7 upon the end of the arm 6. The support 7 is so formed as to give to the base thereof the angular inclination desired. This base forms a supporting surface for the scraper blade 10 which is secured to the base 7 by means of nuts and bolts 11. The material scraped up by the blade 10 readily passes out between the arms 8. The forward edge of the blade 10 is sharpened as indicated in the drawings.

As is apparent from Fig. 1 of the drawings, each radial arm 6 terminates in plow or scraper 6', of any desired shape, which, in the case of an unusually thick deposit on the walls of the vessel 4, removes part of that deposit, and so prepares the way for the knife 10, which scrapes off the remainder.

Preferably the side members 8 of the support 7 are provided with openings to receive the ends of a bolt 12 which may have a piece of tubing 13 thereon and whose ends are secured in position by means of nuts 14. This bolt 12 is so positioned that the tube 13 thereon will coact with the wall of the arm 6 to form a stop, limiting the turning movement of the support 7 about its pivot 9.

When the apparatus is in use, power is applied to the shaft 5 to rotate the shaft and the arm 6 carried thereby. As the ends of the arms are thus propelled through the substance in the tank 4, the pressure of the substance upon the forward surface of the scraper 10 causes the scraper and its support 7 to turn about the pivot 9 by reason of the inclined position of the scraper, in a direction to carry the edge of the scraper outwardly into contact with the wall of the tank 4. The inclination of the scraper is such that it will readily bite into and remove the caked material and will be held but lightly in contact with the wall of the tank. Such light engagement will be sufficient to cause the scraper to remove any hard scale or other deposit upon the wall of the tank and at the same time will permit the scraper to yield as may be required. Such yielding of the blade may be necessary because of differences in the diameter of the tank at different points or deposits on the wall of the tank which cannot be readily removed, or laps in the steel plating from which the peripheral wall of the tank 4 is made. This structure in which the scraper is mounted to follow the radial arm is a distinct improvement over those in which a pivotally mounted scraper precedes its supporting arm. When difficultly removable obstructions are encountered by the scraper of this device, it readily swings about its pivot and rides over them. This yielding action is not so easily obtained where the scraper precedes its radial arm. Under such conditions but little wear of the scraper will occur, but by reason of the removability of the blade, when wear does occur, the substitution of a new blade may be readily effected.

It will be appreciated that any desired number of radial arms 6 may be employed and these may be arranged either one above another or one displaced angularly from another as desired.

I claim:

1. In a device of the character described, the combination of a receptacle, an actuating arm, and a scraper pivoted to the arm and arranged to follow it, provided with a forwardly inclined knife arranged to dig into and remove accumulated material from the walls of the receptacle.

2. In a device of the character described, the combination of a receptacle, an actuating arm provided with a plow, and a scraper pivoted to the arm immediately behind the plow provided with a forwardly inclined knife arranged to dig into and remove accumulated material from the walls of the receptacle.

3. The combination as claimed in claim 1, in combination with a stop to limit the backward pivoting of the scraper.

4. An apparatus for scraping deposits from the vertical wall of a still or similar apparatus, comprising an actuating arm, a following scraper pivoted to the arm, provided with a vertically disposed, forwardly inclined knife, arranged to dig into and remove agglomerated material from the walls of the still.

5. In a device of the character described, the combination of a receptacle, an actuating arm, a pair of knife supporting elements pivoted to the arm and following it, and a knife supported at its ends by the supporting elements, arranged to dig into and remove accumulated material from the walls of the receptacle, the material thus removed passing out between the knife supporting elements.

In testimony whereof I affix my signature.

ALAN ESTIS FLOWERS.